United States Patent [19]

Raidel

[11] Patent Number: 4,858,948
[45] Date of Patent: Aug. 22, 1989

[54] SUSPENSION ASSEMBLY

[76] Inventor: John E. Raidel, Rte. 1, Box 400-M, Springfield, Mo. 65804

[21] Appl. No.: 158,629

[22] Filed: Feb. 22, 1988

[51] Int. Cl.$^4$ .............................................. B60G 11/26
[52] U.S. Cl. ..................................... 280/711; 280/721
[58] Field of Search ............... 280/677, 680, 686, 687, 280/711, 700, 721, 713, 788

[56] References Cited

U.S. PATENT DOCUMENTS 4,518,171  5/1985  Hedenberg ........................... 280/711
4,529,224  7/1985  Raidel .................................. 280/711

Primary Examiner—Richard A. Bertsch
Attorney, Agent, or Firm—Rogers, Howell & Haferkamp

[57] ABSTRACT

A suspension assembly for a vehicle that has a rear-mounted engine and a longitudinal frame member and an axle below the frame member with a bolster beam connected to the axle and air springs connected between the ends of the bolster beam and the frame member. There are outrigger members to locate the air springs outboard for better stability. An upper torque rod and a lower torque rod are arranged parallel to one another and are connected between a bracket assembly on the bolster beam and a bracket assembly supported by the frame member. The torque rods are staggered from one another in three planes. The upper torque rod is forward of the lower torque rod and is outboard of the lower torque rod. Likewise, the forward ends of the torque rods are outboard of the rearward ends. This arrangement significantly enhances the overall stability of the suspension system.

20 Claims, 2 Drawing Sheets

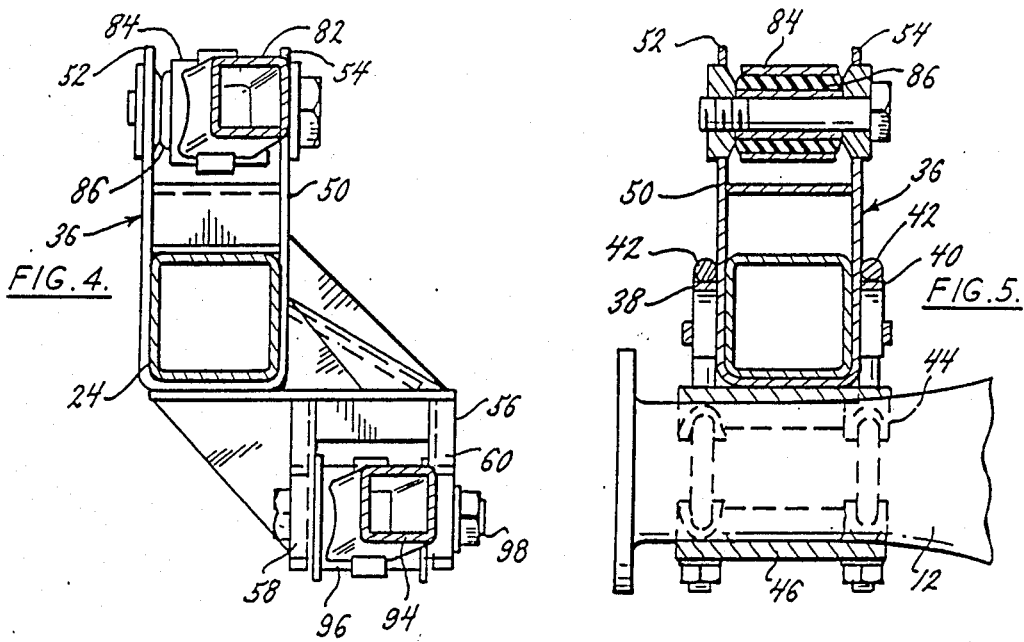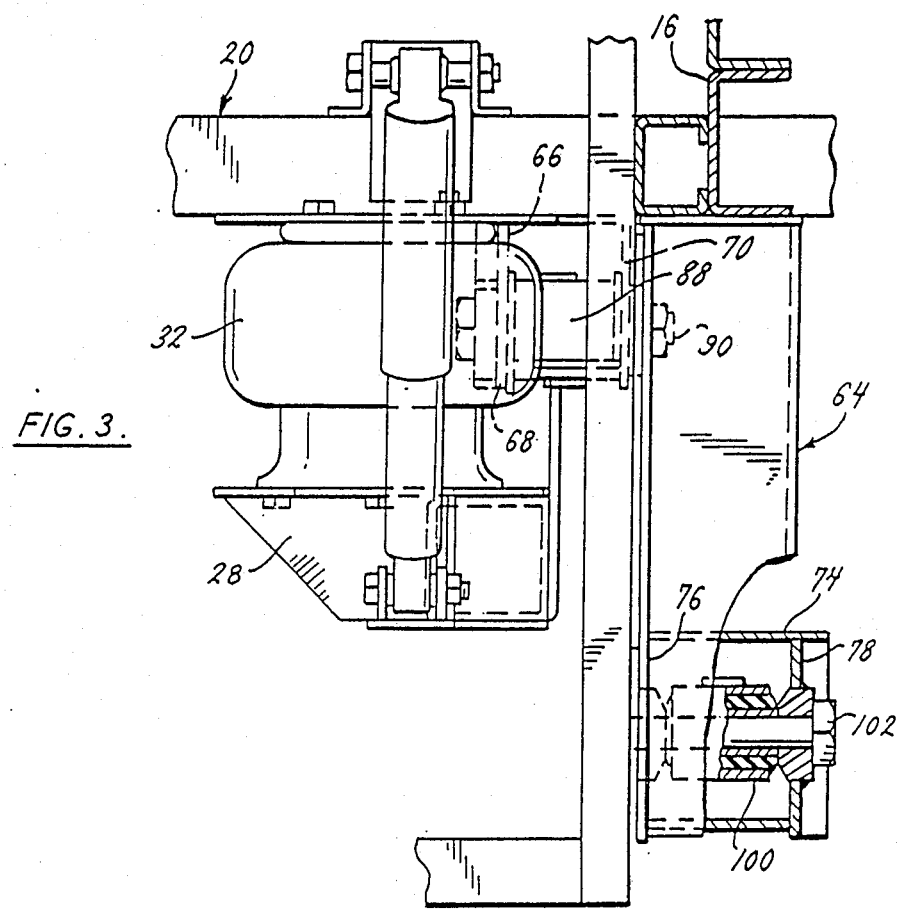

SUSPENSION ASSEMBLY

BACKGROUND AND SUMMARY

Many vehicles, such as buses, are more stable if the suspension provides as wide a support base as possible. In addition, it is common practice to incorporate torque rods arranged in a parallelogram to provide stability and to eliminate the need for a torsion bar or roll bar. A suspension system directed to the forgoing that provides outrigger connections is described and illustrated in U.S. Pat. No. 4,596,402, the disclosure of which is incorporated by reference herein.

The present invention provides a suspension assembly that incorporates a new orintation of two torque rods relative to the axle and chassis of a vehicle. A longitudinal bolster beam is below the chassis. There are outrigger members on the chassis and the bolster beam so that, at the forward and rearward ends of the bolster beam, two air springs can be mounted outboard of the chassis. The axle is connected at the center of the bolster beam and there is a special axle bracket welded to the center of the bolster beam. Likewise, there is a special hanger bracket assembly supported from the chassis. The two torque rods are connected between the axle bracket and the hanger bracket. This suspension assembly is particularly adapted for installation on a vehicle having a rear-mounted engine. Thus, the engine rotates the wheels which push the axle, and the axle acts through the torque rods to pull the vehicle. According to the present invention, the two torque rods are mounted parallel to one another to define a parallelogram. However, the torque rods are offset from one another in three planes. The upper torque rod is outboard of the lower torque rod. The forward ends of the torque rods are outboard of their rearward ends. The upper torque rod is forward of the lower torque rod. The connections of the torque rods to the special bracket on the bolster beam are at points above and below the bolster beam. In addition, the forward end of the upper torque rod is forward and outboard of the forward end of the lower torque rod. The rearward ends of the torque rods are connected respectively to the hanger bracket assembly above and below the bolster beam. Also, the rearward end of the upper torque rod is forward and outboard of the rearward end of the lower torque rod. Nevertheless, the torque rods are of equal length and are identical to one another so that they are interchangeable, thereby reducing inventory requirements.

Because of the orintations of the torque rods, improved stability is provided in all directions. The axle is stabilized against torsional forces because of the vertically spaced connections of the parallelogram. Also, because of the angle of the torque rods as viewed in a horizontal plane, there is greater linear stability of the axle and lateral movement of the axle is effectively prevented.

BRIEF DESCRIPTION OF THE DRAWINGS

FIG. 3 is a rear elevation view of the suspension assembly on an enlarged scale;

FIG. 4 is a view in section taken along the plane of the line 4—4 of FIG. 1; and FIG. 5 is a view in section taken along the plane of the line 5—5 of FIG. 1.

DETAILED DESCRIPTION OF THE SUSPENSION ASSEMBLY

Figure 2:
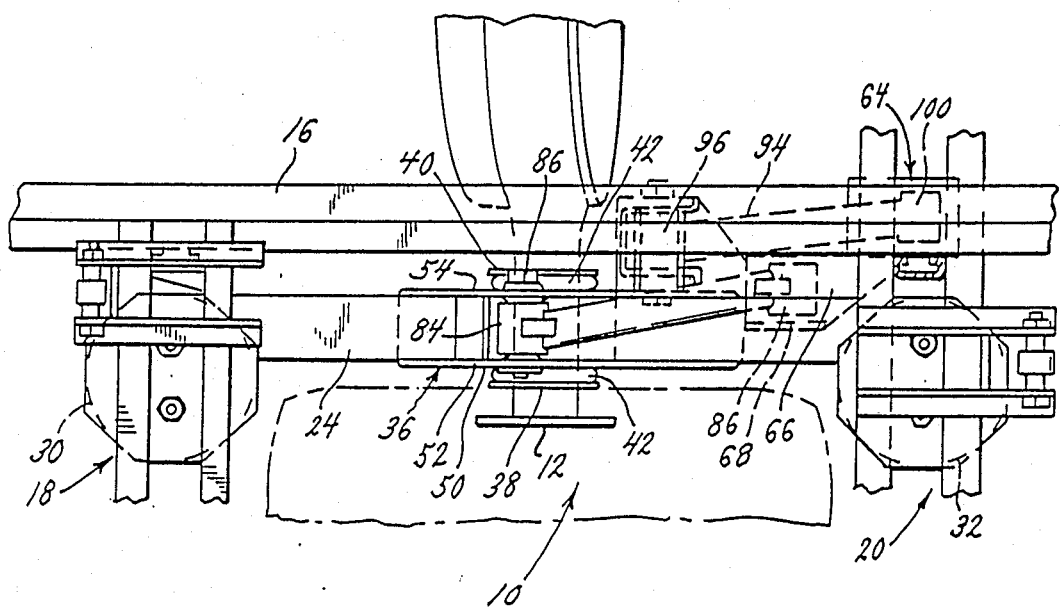
FIG. 2 is a top elevation plan view of the suspension assembly.

This suspension assembly 10 is for installation on a vehicle, and particularly a bus that has a rear engine and drive axle 12 located below a chassis 14. Thus, as viewed in FIGS. 1 and 2, the forward direction of the vehicle is torward the left. The chassis 14 has a longitudinal frame member 16. A forward outrigger assembly 18 extends outboard from the frame member 16 and a rearward outrigger assembly 20 extends outboard from the frame member 16.

A longitudinally extending bolster beam 24 is spaced below and outboard of the frame member 16. At the forward end of the bolster beam 24, there is an outwardly extending plate bracket 26. A similar outwardly extending plate bracket 28 is mounted to the rearward end of the bolster beam 24. A forward air spring 30 is connected between the forward outrigger assembly 18 and the forward outboard bracket 26. Another air spring 32 is mounted between the rearward outrigger assembly 20 and the rearward outboard plate bracket 28.

Figure 1:
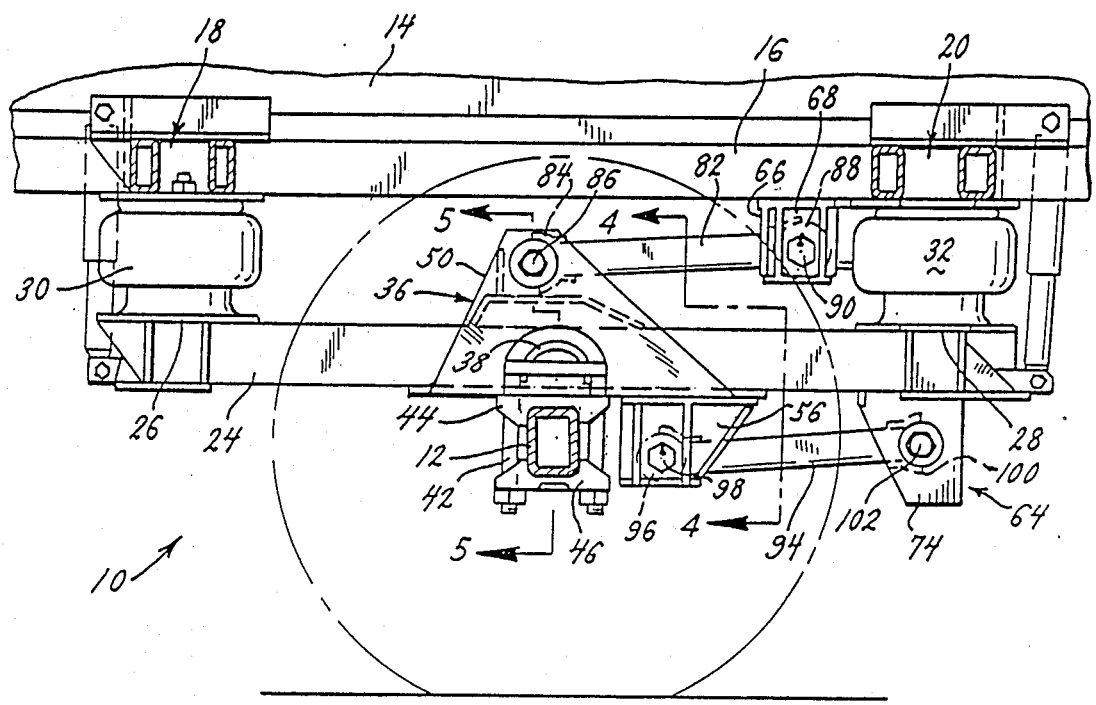
FIG. 1 is a side elevation view of the suspension assembly.

A fabricated bracket assembly 36 is welded to the bolster beam 24, as shown in FIGS. 1 and 5. There are side wings 38 and 40 on the bracket assembly 36. U-bolts 42 and axle brackets 44 and 46 extend around the side wings 38 and 40 for connecting the bracket assembly 36, and thereby the bolster beam 24, to the axle 12. The bracket assembly 36 has an upwardly extending section 50 that includes side plates 52 and 54 that are located generally above and slightly forward of the axle 12. The bracket assembly 36 also includes a lower section 56 that has spaced parallel blocks 58 and 60. The lower section 56 is spaced below, rearward, and inboard of the upper bracket section 50, as shown in FIGS. 1 and 4.

Rearward, and adjacent the air spring 32, there is a hanger bracket assembly 64 that is supported by the frame member 16, as particularly shown in FIG. 3. The hanger frame member 64 has an upper section 66 having spaced parallel plates 68 and 70. This upper section 66 is inboard of the upper section 50 of the bracket assembly 36, but is outboard of the frame member 16. This is shown in FIGS. 2 and 3. The bracket assembly 64 has a lower section 74 that includes parallel plate members 76 and 78. The lower section 74 is rearward, outboard, and below the upper section 66.

An upper torque rod 82 has a forward end 84 mounted on a bushing assembly 86 between the plates 52 and 54 of the upper section 50 of the bracket assembly 36. The upper torque rod 82 has a rearward end 88 mounted on an eccentric bolt and bushing assembly 90 mounted on to the upper section 66 of the bracket assembly 64. The eccentric bolt and bushing assembly 90 is of a kind known in the art.

A lower torque rod 94 has a forward end 96 mounted by an eccentric bolt and bushing assembly 98 to the lower section 56 of the bracket assembly 36. The torque rod 94 has a rearward end 100 mounted on a bushing assembly 102 to the lower section 74 of the bracket assembly 64.

OPERATION

Since the vehicle has a rear-mounted engine and the axle 12 is a drive axle, the engine rotates the wheels that are supported by the axle 12. These wheels push the axle 12, pushing the bolster beam 24 and the bracket assembly 36. Since the torque rods 82 and 94 are pivotally connected to the bracket assembly 36, and are also pivotally connected to the chassis by way of the bracket assembly 64, the axle 12 acts through the torque rods 82 and 94 to pull the vehicle. Since the axle is pulling the vehicle, it is very important that the stability of the axle be maintained, and particularly the lateral stability. This lateral stability is provided by the present invention and particularly by the fact that both the upper and lower torque rods 82 and 94 are at angles to the direction of movement of the vehicle as viewed in a horizontal plane, as shown in FIG. 2. Of course, the suspension assembly on the opposite side of the vehicle is a mirror image of the suspension assembly 10 that is illustrated.

The torque rods 82 and 94 define a parallelogram even though the upper torque rod 82 is positioned outboard of the lower torque rod 94 and the torque rods are at angles with their forward ends 84 and 96 respectively spaced outboard from their rearward ends 86 and 100 respectively. Likewise, the upper torque rod 82 is forward of the lower torque rod 94. The resulting torque rod arrangement greatly improves stability and prevents lateral movement of the axle.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A suspension assembly for a vehicle having an axle and a chassis including a longitudinal frame member comprising a transverse extender projecting outwardly from the frame member, a longitudinal bolster beam spaced outboard of the frame member, means for connecting the bolster beam to the axle, the bolster beam having a spring mounted section below the transverse extender, an air spring mounted between the transverse extender and the spring mounted section, an upper torque rod, a lower radius rod, the torque rods having first and second ends and being of substantially equal length, first means for pivotally connecting the first end of the upper torque rod to the bolster beam at a point generally above the axle, second means for pivotally connecting the first end of the lower torque rod to the bolster beam at a point between the axle and the spring and spaced below and inboard of the first connecting means, third means for pivotally connectng the second end of the upper torque rod to the chassis at a point spaced longitudinally and inboard from the first connecting means, fourth means for connecting the second end of the lower torque rod to the chassis at a point spaced below and inboard of the third connecting means, the torque rods being parallel to one another.

2. The suspension assembly of claim 1 wherein the vehicle has a rear-mounted engine and the axle is a drive axle.

3. The suspension assembly of claim 2 including a first bracket connected between the bolster beam and the first ends of the radius rods, and a second bracket connected between the frame member and the second ends of the radius rods.

4. The suspension assembly of claim 3 wherein the first bracket has an upper section projecting above the bolster beam to which the first end of the upper torque rod is connected and has a lower section projecting below, inboard and spaced longitudinally from the upper section, and the first end of the lower torque rod is connected to the lower section.

5. The suspension assembly of claim 4 wherein the second bracket has an upper section below and outboard of the frame member and inboard of the bolster beam to which the second end of the upper torque rod is connected and has a lower section below and inboard and spaced longitudinally from the upper section, and the second end of the lower torque rod is connected to the lower section.

6. The suspension assembly of claim 2 wherein the first ends of the torque rods are forward of the second ends and the axle is a drive axle.

7. The suspension assembly of claim 6 wherein the bolster beam has a forward section forward of the axle, and another air spring mounted between the forward section and the chassis.

8. The suspension assembly of claim 2 wherein the first ends of the radius rods are outboard of their respective second ends.

9. A suspension system for a vehicle having an axle and a chassis comprising:
   a first torque rod having first and second ends connected between a vehicle axle and a vehicle chassis respectively;
   a second torque rod having first and second ends connected between the vehicle axle and the vehicle chassis respectively;
   the first end of the first torque rod being positioned outboard of the second end of the first torque rod;
   the first end of the second torque rod being positioned outboard of the second end of the second torque rod; and
   the second end of the first torque rod being positioned outboard of the first end of the second torque rod.

10. The suspension system of claim 9 comprising:
    the first torque rod being positioned above the second torque rod.

11. The suspension system of claim 9 comprising:
    the first end of the first torque rod being positioned forward of the first end of the second torque rod, and the second end of the first torque rod being positioned forward of the second end of the second torque rod relative to the vehicle.

12. The suspension system of claim 9 comprising:
    a bolster beam assembly supporting the vehicle axle, and the first ends of the first and second torque rods being pivotally connected to the bolster beam assembly.

13. The suspension system of claim 9 comprising:
    a bracket assembly suspended from the vehicle chassis, and the second ends of the first and second torque rods being pivotally connected to the bracket assembly.

14. The suspension system of claim 9 comprising:
    a bolster beam assembly spaced completely outboard of the vehicle chassis and supporting the vehicle axle, the bolster beam assembly having first and second ends with air spring means positioned between the first and second ends and the vehicle chassis.

15. A suspension system for a vehicle having an axle and a chassis comprising:
   a first torque rod having first and second ends connected between a vehicle axle and a vehicle chassis respectively;
   a second torque rod having first and second ends connected between the vehicle axle and the vehicle chassis respectively;
   the first end of the first torque rod being positioned outboard of the second end of the first torque rod;
   the first end of the second torque rod being positioned outboard of the second end of the second torque rod; and
   the first torque rod being positioned above the second torque rod.

16. The suspension system of claim 15 comprising:
   the second end of the first torque rod being positioned outboard of the first end of the second torque rod.

17. The suspension system of claim 15 comprising:
   the first end of the first torque rod being spaced forward of the first end of the second torque rod, and the second end of the first torque rod being spaced forward of the second end of the second torque rod relative to the vehicle.

18. The suspension system of claim 15 comprising:
   a bolster beam assembly supporting the vehicle axle, and the first ends of the first and second torque rods being pivotally connected to the bolster beam assembly.

19. The suspension system of claim 15 comprising:
   a bracket assembly suspended from the vehicle chassis, and the second ends of the first and second torque rods being pivotally connected to the bracket assembly 20. The suspension system of claim 15 comprising:
   a bolster beam assembly spaced completely outboard of the vehicle chassis and supporting the vehicle axle, the beam assembly having first and second ends with air spring means positioned between the first and second ends and the vehicle chassis.

* * * * *